United States Patent [19]

Sugo et al.

[11] 4,388,907
[45] Jun. 21, 1983

[54] SINGLE POINT FUEL INJECTED INTERNAL COMBUSTION ENGINE AND METHOD OF OPERATING SAME

[75] Inventors: Yuko Sugo; Tadahiro Yamamoto, both of Yokosuka, Japan

[73] Assignee: Nissan Motor Company, Ltd., Yokohama, Japan

[21] Appl. No.: 206,309

[22] Filed: Nov. 12, 1980

[30] Foreign Application Priority Data

Nov. 15, 1979 [JP] Japan .......................... 54-158480[U]

[51] Int. Cl.³ ............................................. F02B 3/00
[52] U.S. Cl. .................................... 123/494; 123/478
[58] Field of Search ............... 123/470, 472, 478, 490, 123/494, 491, 492, 493

[56] References Cited

U.S. PATENT DOCUMENTS 4,096,833 6/1978 Sweet ............................... 123/491 X
4,142,407 3/1979 Kurowa et al. ....................... 73/118
4,200,063 4/1980 Bowler .................................. 123/478
4,256,075 3/1981 Fukui et al. .......................... 123/478

FOREIGN PATENT DOCUMENTS 2146771 3/1973 France .
2171626 9/1973 France .
2366449 4/1978 France .
2465883 3/1981 France .
1196387 6/1970 United Kingdom .
1365979 9/1974 United Kingdom .

Primary Examiner—Tony M. Argenbright
Attorney, Agent, or Firm—Schwartz, Jeffery, Schwaab, Mack, Blumenthal & Koch

[57] ABSTRACT

A disc having first and second sets of markers thereon is rotated in sychronism with the crankshaft of an engine so that pickups associated with the disc produce pulse trains of two and three pulses per revolution of the crankshaft respectively. A circuit responsive to either the speed or load of the engine selectively connects one of the pulse trains to a fuel injection control circuit to induce the fuel injector to inject in synchronism with the pulses of the selected pulse train. Alternatively the pulses outputted by the ignition system are frequency divided and fed to the fuel injection control circuit.

3 Claims, 5 Drawing Figures

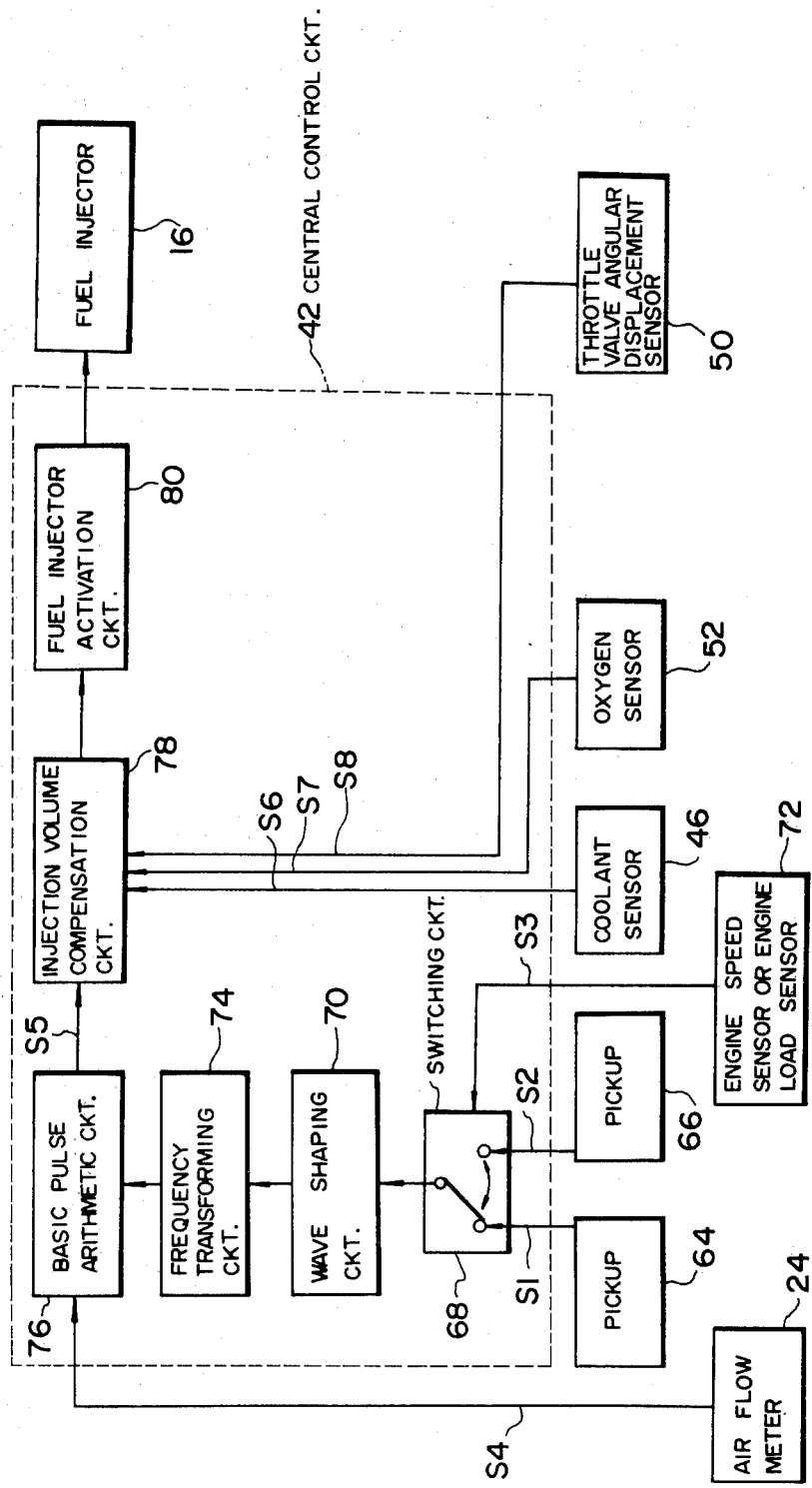

SINGLE POINT FUEL INJECTED INTERNAL COMBUSTION ENGINE AND METHOD OF OPERATING SAME

BACKGROUND OF THE INVENTION

1. Field of the Invention

The present invention relates generally to an internal combustion engine and more particularly to an internal combustion engine having a single point injector which is operated to vary the number of injections per revolution of the crankshaft in accordance with various operating parameters of the engine.

2. Description of the Prior Art

In known single point injection (SPI) engines it has been proposed to energize the injector either once or three times per revolution of the crankshaft of the engine. However, these arrangements have suffered from the drawbacks that at low engine speed operation the single injection method has failed to provide an adequate fuel distribution to the cylinders, while the three injection method produces an acceptable fuel distribution at low engine speed but it is unable to maintain linearity between the injector trigger pulse width and the actual injection at high engine operation. This has been particularly the case in six (or more) cylinder engines wherein the rate of energization of the single injector is three times higher than in the case of multi point injection (MPI) wherein each of the six cylinders is fed fuel from an individual injector.

SUMMARY OF THE INVENTION

The present invention features an arrangement wherein the engine is provided with a crankshaft angular displacement sensor which is capable of simulaneously outputting one train of pulses at 180 degree intervals and the other at 120 degree intervals of each revolution of the engine crankshaft. One of these pulse train signals is selected on the basis of the operational parameters such as load or engine speed and fed into circuitry which subsequently produces a suitable injector activation pulse train to either activate the injector twice or three times per revolution of said crankshaft.

Alternately the invention features the use of a signal such as generated by the ignition system which is appropriately frequency divided to obtain an input signal suitable for processing to obtain a suitable train of fuel injector activation pulses for activating the fuel injector 1, 1.5 (viz., three injections per two revolutions) 2, or three times per revolution of the crankshaft.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The features and advantages of the present invention will become more clearly appreciated from the following description taken in conjunction with the accompanying drawings in which like reference numerals denote corresponding elements, and in which

FIG. 3 is a schematic or black box diagram of circuitry used in conjunction with the rotational angle sensor shown in FIGS. 2A and 2B.

DETAILED DESCRIPTION OF THE PREFERRED EMBODIMENTS

Figure 1:
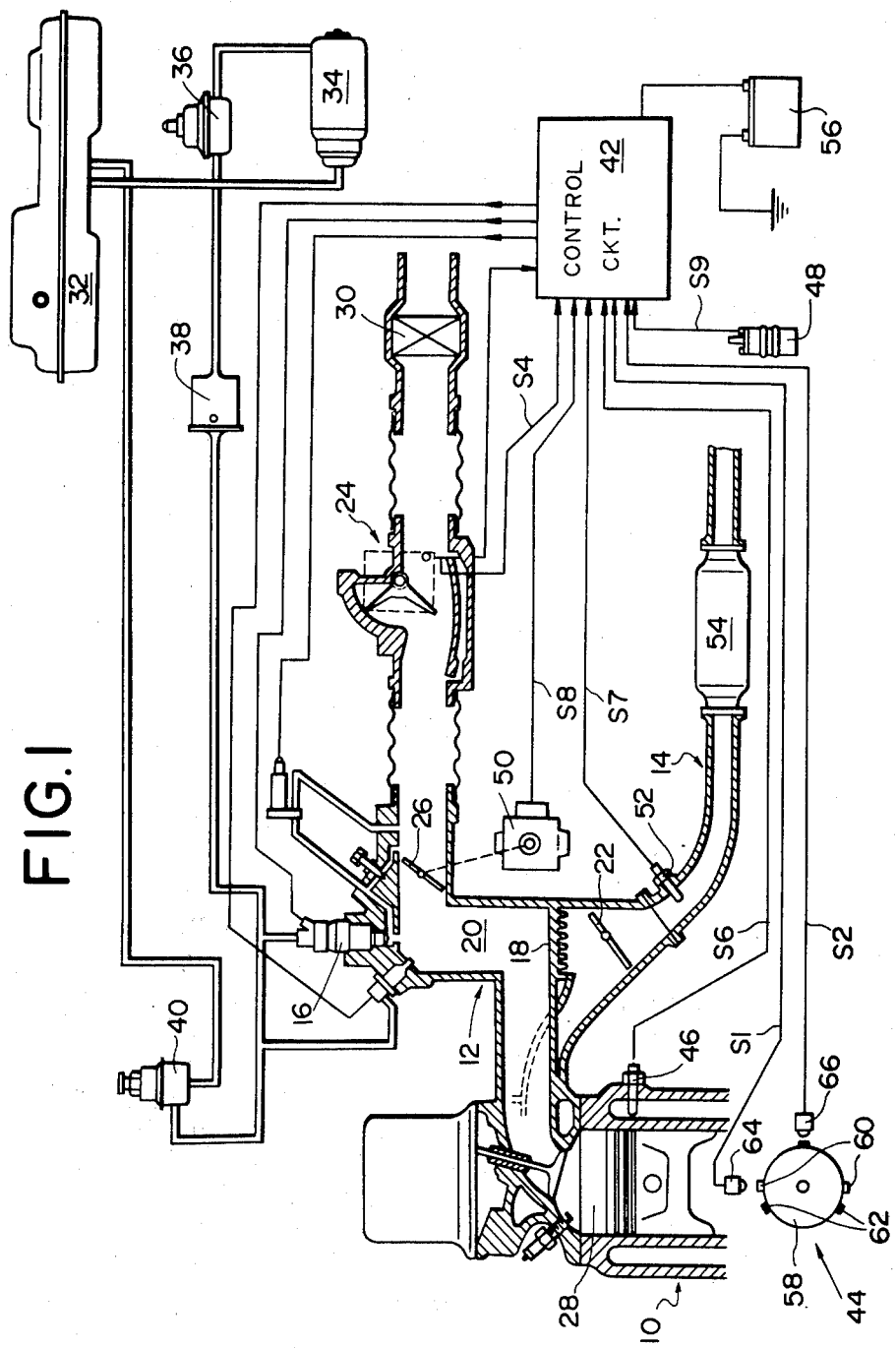
FIG. 1 is a schematic layout of an internal combustion engine equipped with present invention.

Turning now to the drawings and more specifically to FIG. 1 a first embodiment of the present invention is shown. In this figure the numeral 10 denotes an internal combustion engine having an induction system 12 and an exhaust system 14. A single point fuel injector 16 is disposed in the induction system and oriented to inject fuel toward the bottom 18 of a riser 20 defined in the induction system. The bottom 18 of the riser is heated by the exhaust gases flowing through the exhaust system 14. A thermostatically controlled valve member 22 is disposed in the exhaust system for controllably deflecting the exhaust gases against the riser bottom 20 for varying the amount of heat imparted to the incomming air-fuel charge.

An air-flow meter 24 is disposed in the induction system for sensing the amount of air inducted into the engine. A throttle valve 26 is disposed downstream of the air-flow meter for controlling the amount of air permitted to be inducted into the cylinders 28 (only one shown) of the engine. An air cleaner 30 is disposed upstream of the air-flow meter for removing dust and the like from the air prior to entry into the induction system.

The fuel injector 16 is supplied fuel under pressure from a system including an injector pump 34, a fuel pressure damper 36, a fuel filter 38, and a fuel pressure regulator 40. This system is of course one of a number of well known systems, and as such, no further description will be given for the sake of brevity.

The fuel injector 16 is controlled by a central control circuit 42 which is fed various engine operation data from various sensors. These sensors include the air-flow meter 24, a crankshaft rotation or angular displacement sensor 44, an engine coolant sensor 46, an engine ignition system 48, a throttle valve angular position sensor 50, and an oxygen sensor or the like 52 disposed in the exhaust system upstream of a catalytic converter 54. The control circuit 42 is energized by connection to a source of EMF such as a battery 56.

Figures 2A, 2B:
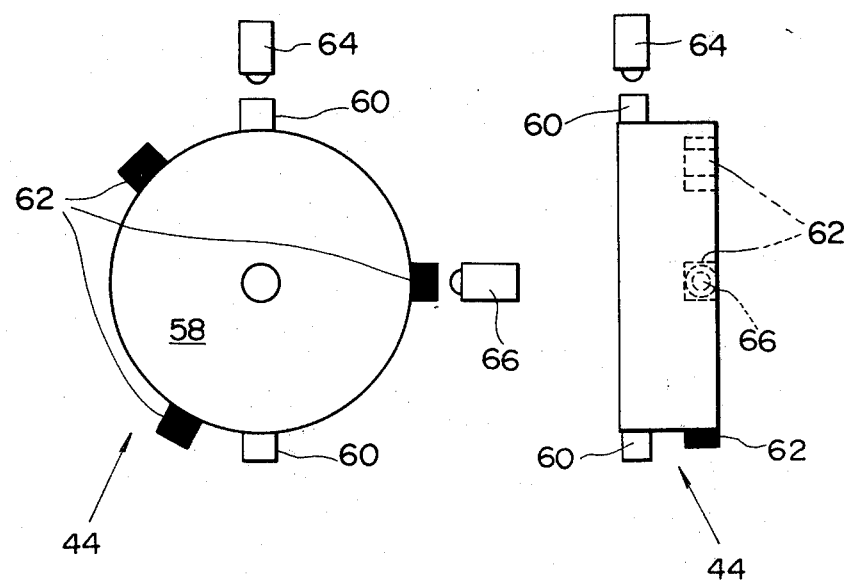
FIGS. 2A and 2B are plan and elevation views respectively of a rotational angle sensor forming part of the present invention.

FIGS. 2A and 2B are englarged views of the crankshaft angular displacement sensor 44. As shown the sensor generally denoted by 44 takes the form of a disc 58 operatively connected to the crankshaft (not shown) of the engine for synchronous rotation therewith. The disc 58 has first and second sets of markers 60, 62 provided on the periphery thereof. The first set of markers consist of two equidistantly spaced projections while the second set consists of three equidistantly spaced projections. Two pickups 64 and 66 are arranged to juxtapose the periphery of the disc to sense the movement of the first and second set of markers respectively, and to accordingly output signals S1 and S2. Signal S1 of course consists of two pulses per revolution of the crankshaft while S2 consists of three. As best shown in FIG. 1 the pickups 64, 66 are connected to the central control circuit 42 to feed the signals S1 and S2 thereto.

FIG. 3 shows schematically the circuitry of the central control circuit 42 and its connection with the various sensors and fuel injector. As illustrated the pickups 64 and 66 which simultaneously output signals S1 and S2 are connected to a switching circuit 68 which selectively connects one of the pickups with a wave shaping circuit 70 in accordance with an input S3 from sensor 72 which indicates either engine speed or induction load. It will be of course appreciated that the engine speed may be represented by the output of the pickup 64 and the induction load signal by the output of the throttle valve angular position sensor 50. Alternatively other suitable sensors (not shown) may be used to provide the necessary input S3 on the basis of which the signal S1 or S2 is selected.

The output of the wave shaping circuit 68 is fed to a frequency transforming circuit 74 and thereafter to a basic pulse arithmetic circuit 76. The basic pulse arithmetic circuit 76 is also fed an input signal S4 from the air flow meter 24. An output signal S5 having a basic pulse width is then fed from the basic pulse arithmetic circuit 76 to an injection volume compensation circuit 78. This circuit receives inputs S6,S7,S8 from the coolant sensor 46, oxygen sensor 52, and the throttle valve angular position sensor 50 respectively, and subsequently computes the variation in the width of the signal S5 required in view of the information fed thereto. The injector actuating circuit 80 is accordingly fed an input representative of the momentary fuel requirement of the engine such as those which prevail under acceleration/deceleration etc., and functions to output a suitable fuel injector trigger pulse train which is fed to the fuel injector 16.

Figure 4:
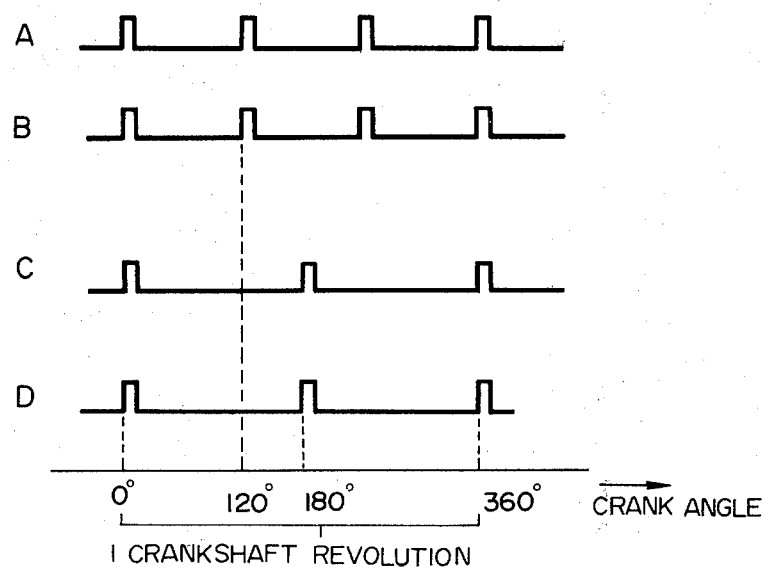
FIG. 4 is a timing chart showing the injector trigger pulse signals ouputted by the circuitry shown in FIG. 4 and the resultant injection timings.

In operation when the engine operates at relatively low engine speeds (4000 RPM for example) and low load, the switching circuit 68 under the influence of the input S3 connects pickup 66 to the wave shaping circuit 70 so as to feed thereto signal S2 (viz. three pulses per revolution). Thus, as the air flow is relatively low at this time the basic pulse arithmetic circuit, under the influence of the input S4 outputs a signal S5 having a suitable basic pulse width for the given conditions. The fuel injector is accordingly fed a train of trigger pulses shown in FIG. 4A to be activated to inject fuel three times per revolution of the crankshaft viz., at 120 degree intervals as shown in FIG. 4B. However, upon the engine speed exceeding a predetermined level (for example 4000 RPM) the switching circuit 68 under the influence of the input signal S3 connects the pickup 64 to the wave shaping circuit to induce a train of trigger pulses as shown in FIG. 4C which causes the fuel injector to inject twice per revolution of the crankshaft as shown in FIG. 4D. In the case of a six cylinder engine this change from three injections to two injections per revolution of the crankshaft will lower the operating frequency of the fuel injector from 300 Hz (at which frequency the linearity between the injection trigger pulse width and the amount of the fuel actually injected deteriorates) to 200 Hz. It will also be appreciated that if only one projection was formed on the disc 58 or a frequency divider were provided in the circuit illustrated in FIG. 3 then the fuel injector could be operated to inject only once per revolution of the crankshaft and accordingly operate at a frequency of 100 Hz.

With the just described embodiment it will be appreciated that ready selection of the number of injections per revolution of the crankshaft can be readily achieved to optimize the fuel distribution to the cylinders of the engine under high, intermediate and low engine speeds and load conditions and simultaneously avoid any erroneous air-fuel control due to the inability of the fuel injector to operate properly at high frequencies.

A second embodiment of the present invention takes the form of using an ignition signal S9 in place of the signals S1 and S2 either alone or in combination with a frequency divider to obtain the desired pulse train outputs. With the latter method it is possible to appropriately select 1, 2, or 3 injections per revolution or 3 injections per two revolution of the crankshaft.

Thus in summary, according to the present invention at least two pulse train signals are produced, one of which is selectively fed to a fuel injection control circuit in response to either engine speed or load to vary the number of injections per revolution of the crankshaft to maintain an adequate fuel distribution despite changes in the engine speed, load and or other engine operating parameters.

The foregoing description of the preferred embodiments of the invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a multi-cylinder internal combustion engine having an ignition system, a crankshaft and a single fuel injector for forming the air-fuel mixture fed to the multiple cylinders of said engine, the combination of:
    means for producing pulses at a first rate which pulses define a first pulse train signal;
    means for producing pulses at a second rate which is lower than said first rate and which pulses define a second pulse train signal;
    a fuel injection control circuit operatively connected to said single fuel injector for controlling the injections thereof; and
    a circuit responsive to one of the speed of said engine and the load of said engine and which selectively supplies said first pulse train signal to said fuel injection control circuit when said one of said engine speed and engine load is below a predetermined level and which selectively supplies said second pulse train signal to said fuel injection control circuit when said one of said engine speed and engine load are above said predetermined level and which induces said single fuel injector to inject fuel in synchronism with the pulses of the selected one of said first and second pulse train signals, said first and second pulse producing means taking the form of a disc operatively connected to said crankshaft for synchronous rotation therewith, said disc having first and second sets of markers thereon; and first and second pickups juxtaposed said disc to be respectively responsive to the movement of said first and second markers.

2. In a method of operating a multi-cylinder internal combustion engine having an ignition system, a crankshaft and a single fuel injector for forming the air-fuel mixture fed to the multiple cylinders of the engine, the steps comprising:
  producing pulses at a first rate of two pulses per rotation of said crankshaft, which pulses define a first pulse train signal;
  simultaneously producing pulses at a second rate of three pulses per rotation of said crankshaft, which pulses define a second pulse train signal;
  detecting one of the engine speed and engine load;
  selecting one of said first and second pulse train signals in accordance with the magnitude of the detected one of said engine speed and engine load; and
  operating said fuel injector to inject fuel in synchronsim with the pulses of the selected one of said first and second pulse train signals.

3. A method as claimed in claim 2, further comprising the step of frequency dividing the ignition signal issued by said ignition system to produce said first and second pulse train signals.

* * * * *